United States Patent Office 2,800,482
Patented July 23, 1957

2,800,482

OLEFINIC DERIVATIVES OF 8-ALKYLNORTRO-PANES AND THE ACID AND QUATERNARY AMMONIUM SALTS THEREOF

Charles L. Zirkle, Haddon Heights, N. J., assignor to Smith, Kline & French Laboratories, Philadelphia, Pa., a corporation of Pennsylvania No Drawing. Application July 1, 1955,
Serial No. 519,650

6 Claims. (Cl. 260—292)

This invention relates to certain new physiologically active olefinic derivatives of 8-alkylnortropanes and the organic and inorganic salts thereof. It also relates to quaternary ammonium salts of olefinic derivatives of 8-alkylnortropanes.

The new chemical compounds according to this invention have utility, for example, for treating the parasympathetic nervous system in providing, for example, antispasmodic and anticholinergic action and further have utility as antiemetics and for treating the central nervous system, for example, for treating psychotics and psychoneurotics. The compounds of this invention also have utility as intermediates for use in the preparation of compounds having utility for treating the parasympathetic nervous system in providing, for example, antispasmodic and anticholinergic action and further having utility as antiemetics and for treating the central nervous system, for example, for treating psychotics and psychoneurotics. Where the salts are used for therapeutic purposes, it will be obvious to those skilled in the art to select a nontoxic salt.

The new compounds according to this invention are the dehydration products of the tertiary alcohols having the structure shown by the following formula:

FORMULA 1

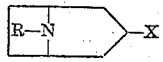

in which:
R is a straight or branched chain lower alkyl radical having preferably from 1 to 4 carbon atoms.
X is selected from the group consisting of

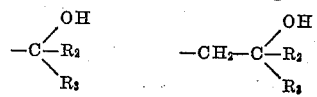

which is preferred;

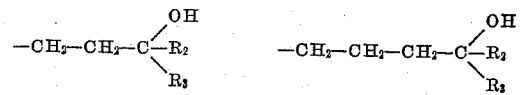

$R_2$ and $R_3$ being selected from the group consisting of straight or branched chain lower alkyl groups having preferably from 1 to 6 carbon atoms, cycloalkyl groups having from 5 to 6 carbon atoms, cycloalkyl-alkyl having 6 to 10 carbon atoms, 2-thienyl, 2-pyridyl, phenyl, phenyl substituted with an alkyl group having not in excess of 4 carbon atoms and phenyl substituted with an alkoxy group having not in excess of 4 carbon atoms.

More succinctly, the new compounds of this invention are the dehydration products of the compounds having the structure shown in the following formula:

FORMULA 2

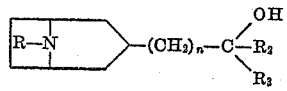

in which: R, $R_2$, $R_3$ are as given above and $n$ is from 0 to 3, preferably 1.

Where hereinafter the symbols R, $R_2$ and $R_3$ and $n$ are mentioned in the description, they will indicate the substituents indicated for them in connection with the above general formulas except where otherwise specifically indicated.

As will be clear to those skilled in the art, the dehydration of the tertiary alcohols of the above formula involves the removal of the elements of water which are supplied by the hydroxyl group bonded to the tertiary carbon atom and a hydrogen atom bonded to a carbon atom which is directly bonded to the tertiary carbon atom.

The dehydration to produce the compounds of this invention can be readily accomplished by, for example, treating the alcohols of Formulas 1 or 2 with a dehydration agent and separating out the dehydrated product. Exemplary of dehydration agents are a mineral acid, such as, for example, hydrochloric, sulfuric, phosphoric and organic acids such as oxalic, trichloracetic, lower fatty acid anhydrides, such as acetic anhydride and propionic anhydride, carboxylic acid chlorides, such as acetyl chloride and propionyl chloride or thionyl chloride.

Thus, by way of more specific example, the amino alcohol can be dissolved in a mixture of acetic acid and concentrated hydrochloric acid and this solution refluxed for a period of ten minutes to one hour. The hydrochloride of the dehydration product may then be isolated by removing the acetic acid and excess hydrochloric acid by evaporation under reduced pressure. The free base can be obtained by treating the thus formed hydrochloride with an excess of alkali or other base such as, for example, sodium hydroxide or ammonia and then extracting the free base into a solvent such as ether or chloroform. The thus obtained solution may be dried and treated with other acids to form different salts or the solution can be reacted with an excess of an organic ester of sulfuric, hydrohalic or aromatic sulfonic acid to form a quaternary ammonium salt.

It will be understood that where either or both $R_2$ and $R_3$ are other than aromatic, the dehydration products from the carbinols of Formula 2 may be isomers by virtue of differences in the relative location of the carbon-carbon double bond generated in the dehydration process. Where $R_2$ and $R_3$ are non-aromatic and different, the double bond generated may take any one of the three positions indicated at "a," "b" or "c" below where "C" represents the carbon atom which originally carried the hydroxyl group:

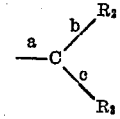

Where $R_2$ and $R_3$ are non-aromatic and the same, only two double bond isomers are possible since the "b" and "c" positions are equivalent. Where only one of $R_2$ or $R_3$ is aromatic, for example, $R_3$, the double bond may take either of the positions indicated at "a" or "b" below:

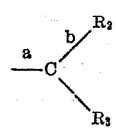

Where both $R_2$ and $R_3$ are aromatic the double bond can be generated in only one position indicated at "a" below:

FORMULA 2A

Advantageously the compounds of this invention have the following formula:

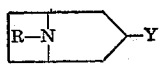

in which R is as given above, Y is selected from the group consisting of

  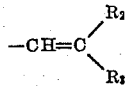

which is preferred;

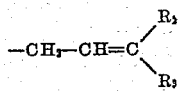  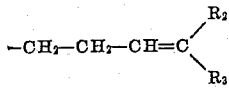

$R_2$ and $R_3$ being selected from the group consisting of 2-thienyl, 2-pyridyl, phenyl, phenyl substituted with an alkyl group having not in excess of 4 carbon atoms and phenyl substituted with an alkoxy group having not in excess of 4 carbon atoms.

The organic and inorganic salts of the base of the above formulas contemplated by this invention include by way of example salts of the base formed with organic acids such as, for example, tartaric, maleic, camphor sulfonic, citric, acetic, propionic, butyric, succinic, glutaric, adipic, abscorbic, lactic, levulinic, malic, mandelic, cinnamic, gluconic, methanesulfonic, benzene sulfonic, fumaric, citraconic, itaconic, lauric, stearic, myristic, palmitic, linoleic, aspartic and sulfoacetic, and inorganic acids such as, for example, hydrochloric, hydrobromic, sulfuric, sulfamic, phosphoric, nitric, etc. and can readily be produced by reacting the free base with the appropriate acid.

This invention also embraces quaternary ammonium salts formed with organic esters of sulfuric, hydrohalic and aromatic sulfonic acids. Exemplary of such esters are methyl chloride, methyl bromide, methyl iodide, ethyl chloride, propyl bromide, butyl chloride, isobutyl chloride, ethylene bromohydrin, ethylene chlorohydrin, allyl bromide, methallyl bromide, crotyl bromide, benzyl chloride, benzyl bromide, naphthylmethyl chloride, phenethyl bromide, dimethyl sulfate, diethyl sulfate, methyl benzene-sulfonate, ethyl toluene-sulfonate, and the like.

The quaternary ammonium salts will be prepared by treating a solution of the base of the above structural formulas in a suitable solvent such as chloroform, acetone, benzene, toluene or ether with an excess of an organic ester of sulfuric, hydrohalic or aromatic sulfonic acid. This reaction will be carried out most advantageously at a temperature in the range of from about 25° C. to about 115° C.

The tertiary alcohols of Formula 2 used to make the dehydration products of this invention may be prepared by first producing a compound of the following structure:

FORMULA 3

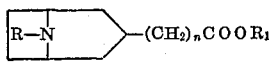

in which:

R is a straight or branched chain lower alkyl radical having preferably from 1 to 4 carbon atoms.

$R_1$ is selected from the group consisting of hydrogen and a straight or branched chain lower alkyl radical having preferably from 1 to 4 carbon atoms and $n$ is from 0 to 3.

The compounds of Formula 3 may be variously produced by Methods A through D.

METHOD A

The compounds of Formula 3 where $n$ is 0 or obtained by the reaction sequence outlined below:

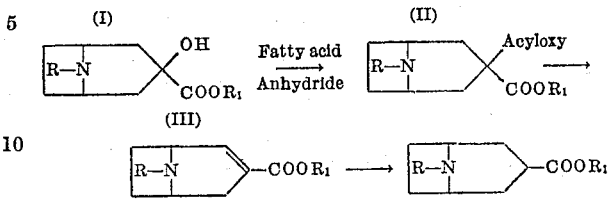

The acyloxy ester (II) is obtained in good yield when the hydroxy ester (I), preferably with $R_1$=methyl, is treated with an excess of lower fatty acid anhydride having preferably 4 to 8 carbon atoms, advantageously with an excess of acetic anhydride. Pyrolysis of the acyloxy ester (II) using a temperature of about 350° C. to about 500° C. by passage of the acyloxy ester through a column packed with, for example, inert heat resistant beads, tubes or rods such as clay or heat resistant glass (Pyrex) beads, tubes or rods, and swept with nitrogen, and heated to a temperature in the range of about 350° C. to about 500° C. furnishes the unsaturated ester (III). The saturated ester (IV, $R_1$=lower alkyl) is obtained by hydrogenation of the unsaturated ester (III) using, for example, a noble metal catalyst such as platinum or palladium or a Raney nickel catalyst and at room temperature and atmospheric pressure or at elevated temperatures and pressures. The acid (IV, $R_1$=H) is obtained as the hydrochloride salt by refluxing the saturated ester with an excess of hydrochloric acid and then removing the excess acid in vacuo. The thus formed acid is readily esterified to produce the ethyl, propyl, butyl esters, etc. using ethanol, propanol and butanol, etc. respectively.

METHOD B

The preparation of the compounds of Formula 3 above where $n$ is from 1 to 3 is illustrated for the preparation of these compounds where $n=1$ in the scheme below:

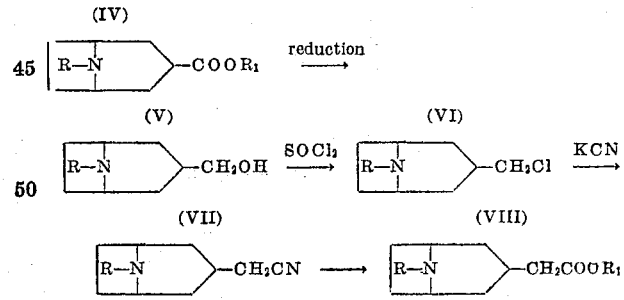

The carboxylic acid or ester (IV) is reduced to the carbinol (V) using, for example, lithium aluminum hydride, or in the case of the esters, using sodium-alcohol combinations, or catalytic hydrogenation. The halide (VI), in the form of its hydrochloride salt, is obtained from the reaction of (V) with excess thionyl chloride. The halide base (VI) is converted to the nitrile (VII) by reaction with sodium or potassium cyanide preferably in an aqueous alcohol medium. The acid (VIII, $R_1=H$) is formed by acidic or basic hydrolysis of the nitrile (VII). The ester (VIII, $R_1$=lower alkyl) may be obtained by esterification of the acid (VIII, $R_1=H$) or alternatively by alcoholysis of the nitrile (VII).

It will be apparent to those skilled in the art that the application of the above reaction sequence to the ester or acid (VIII) will furnish the ester or acid having the following structure:

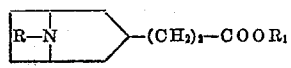

and that in turn when this compound is subjected to the above reaction sequence a compound having the following structural formula will result:

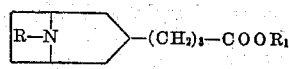

METHOD C

By way of further example, the compounds of Formula 3 above where $n$ is 1 may also be readily made by the reaction sequence outlined below:

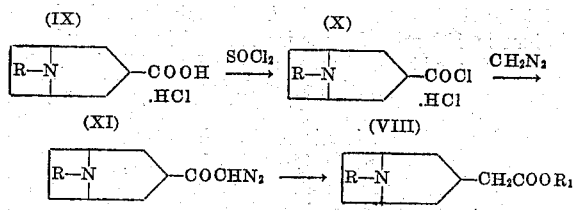

The hydrochloride of the amino acid (IX) is converted to the acid chloride hydrochloride (X) which in turn yields the diazoketone (XI) by reaction with a large excess of diazomethane. The diazoketone (XI) is converted in the presence of a suitable catalyst, as, for example, silver oxide and a suitable medium such as, for example, methanol, ethanol, propanol, or butanol, to the ester (VIII). Where an aqueous medium is used the carboxylic acid (VIII) is produced. Similarly, the hydrochloride of the amino acid

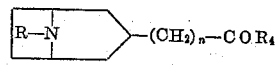

when used as the starting material in the above described reaction sequence will form the compounds of Formula 3 above where $n=2$. Similarly the hydrochloride of the compound of Formula 3 where $n=2$ can then in turn be used as the starting material in the reaction sequence given above to form the compounds of Formula 3 above where $n=3$.

METHOD D

The compounds of Formula 3 above where $n=1$ may also be formed by the following reaction sequence:

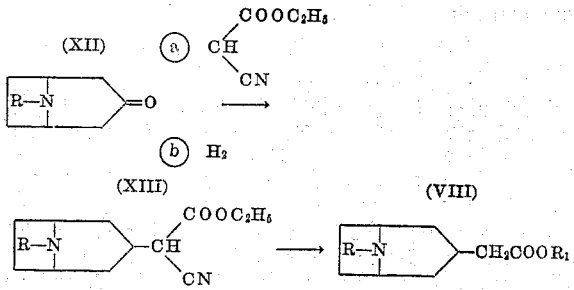

An N-alkyl-nor-tropinone (XII) is reacted with a lower alkyl ester of cyanoacetic acid such as methyl, ethyl or butyl, cyanoacetate (the ethyl ester being specifically illustrated above) using as a solvent, for example, a lower fatty acid such as propionic, acetic or butyric acid and preferably in the presence of a catalyst which is a salt of a weak acid and a weak base, for example, ammonium acetate. The thus formed unsaturated cyano ester is then hydrogenated at a temperature of about 40° C. to 80° C. in the presence of a noble metal catalyst such as platinum or palladium to the N-lower alkyl-3-[(α-cyano-α-carbalkoxy)-methyl]-nortropane. Saturated cyano ester (XIII) is hydrolyzed and decarboxylated to 3(N-alkyl-nortropane) acetic acid by heating with an excess of a volatile mineral acid such as a hydrohalic acid such as hydrobromic or hydrochloric acid. The removal of the excess mineral acid by distillation in vacuo leaves the amino acid salt (VIII, $R_1=H$) which can readily be esterified with a lower aliphatic alcohol in the presence of a strong acid, for example, a hydrohalic acid such as hydrochloric or hydrobromic acid, sulfuric acid or para toluenesulfonic acid.

The esters of Formula 3 may be used to produce the tertiary alcohols of Formula 2 where $R_2$ and $R_3$ are the same by reacting the esters of Formula 3 with the lithium or magnesium derivative prepared from lower alkyl bromides, cyclohexyl bromides, cyclopentyl bromides, cycloalkyl-alkyl bromides having 6 to 10 carbon atoms, phenyl bromide, lower alkyl or lower alkoxy substituted phenyl bromides, 2-bromopyridine and 2-bromothiophene as illustrated by the following general scheme:

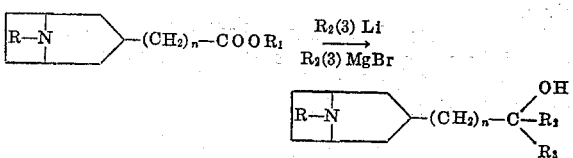

In general, it will be desirable to use the lithium derivative instead of the magnesium derivative, except in the case of cycloalkyl bromides, since the chief product using the organo magnesium reagent will usually be the corresponding ketone and the desired carbinol will be formed only in low yield. In carrying out this reaction, it is advantageous to use a solvent such as diethyl ether and to employ an excess of the organo-metallic reagent.

The tertiary alcohols of Formula 2 where $R_2$ and $R_3$ are the same or different can be prepared by utilizing the compounds of Formula 3 to prepare an intermediate compound having the following structure:

FORMULA 4 in which:

$R_4$ is selected from the group consisting of straight or branched chain lower alkyl groups having preferably 1 to 6 carbon atoms, 2-thienyl, cyclopentyl, cyclohexyl, cycloalkyl-alkyl having 6 to 10 carbon atoms, phenyl, phenyl substituted with an alkyl group containing not in excess of 4 carbon atoms and phenyl substituted with an alkoxy group containing not more than 4 carbon atoms.

The compounds of Formula 4 are readily formed by reacting the Grignard derivative prepared from straight or branched chain lower alkyl bromides having preferably 1 to 6 carbon atoms, phenyl bromide, lower alkyl substituted phenyl bromide, lower alkoxy substituted phenyl bromide, 2-bromothiophene, cyclohexyl bromide, cyclopentyl bromide, a cycloalkyl-alkyl bromide having 6 to 10 carbon atoms with one of the esters defined in Formula 3 above. It is desirable to carry out the Grignard reaction in a solvent, such as diethyl ether, using a molar excess of the Grignard reagent. The resulting amino ketones (Formula 4) will be isolated and purified by distillation or by the crystallization of the organic or inorganic acid salts from a suitable solvent. The intermediate amino ketone compounds of Formula 4, except for the cyclopentyl and cyclohexyl compounds, are also readily formed by the reaction of the lithium derivative prepared from lower alkyl bromides, cycloalkyl-alkyl bromides having 6 to 10 carbon atoms, phenyl bromide, lower alkyl substituted phenyl bromides, lower alkoxy substituted phenyl bromides, 2-bromothiophene, with one of the carboxylic acids defined in Formula 3 above. This reaction is carried out using a solvent such as diethyl ether and preferably employing an excess of the lithium reagent.

The intermediate amino ketone of Formula 4 can be used to produce the carbinols of Formula 2, where $R_2$ and $R_3$ are the same or different as illustrated by the following scheme:

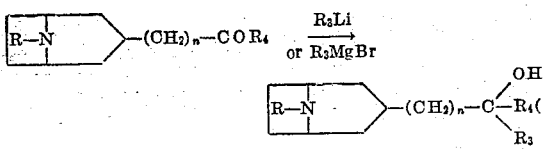

The ketone is reacted with the lithium or magnesium derivative prepared from lower alkyl bromides, cycloalkyl bromides having 5 to 6 carbon atoms, cycloalkyl-alkyl bromides having 6 to 10 carbon atoms, phenyl bromides, substituted phenyl bromides, 2-bromopyridine and 2-bromothiophene, depending on the end product desired and desirably in a solvent such as diethyl ether and using an excess of the lithium or magnesium reagent. In general superior yields are achieved using the lithium derivatives.

The carbinols of Formula 2, having been prepared by one of these methods, will be dehydrated to produce the compounds of this invention following one of the previously described methods.

UTILITY AS INTERMEDIATES

The compounds of this invention, the dehydration products of the carbinols of Formula 2, are useful as intermediates in the preparation of compounds having the following formula and which have utility, for example, for treating the parasympathetic nervous system in providing, for example, antispasmodic or anticholinergic action and further have utility as antiemetics and for treating the central nervous system, for example, for treating psychotics and psychoneurotics:

FORMULA 5

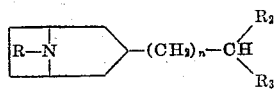

The dehydration products of the carbinols of Formula 2 in the form of the base or salt in a solvent such as ethanol are hydrogenated in the presence of a catalyst such as platinum, palladium or Raney nickel at a pressure in the range from one atmosphere to 1000 p. s. i. and at a temperature in the range of from room temperature to 100° C. The catalyst is removed by filtration and the solvent evaporated. The end product (the compound of Formula 5) in its pure state can then be obtained in the form of a salt by crystallization or in the form of a base by fractional distillation in vacuo.

This invention will be further clarified by the following examples:

Example 1.—3-benzohydrylidenetropane

*Methyl 3-(3-acetoxytropane)carboxylate (α-ecgonine acetate).*—A solution of 10 g. of methyl 3-(3-hydroxytropane)carboxylate (methyl α-ecgonine) (Willstatter, Ber. 29, 1575 (1896) in 50 ml. of acetic anhydride is heated at 100° C. for 4 hours. The excess acetic anhydride and acetic acid are removed in vacuo and the residue poured into ice water. The mixture is saturated with potassium carbonate and the product extracted with ether. After evaporation of ether the crude methyl 3-(3-acetoxytropane)-carboxylate is purified by distillation; B. P. 162–165° C. (15 mm.); M. P. 66–67° C. The picrate after recrystallization from alcohol-water mixture melts at 215–217.5° C.

*Methyl 3-(2-tropene)carboxylate.*—Methyl 3-(3-acetoxytropane)-carboxylate (29 g.) is added dropwise over a 7 min. period to a vertical Pyrex tube (25 mm. diameter), packed for a length of 8 in. with ¼ to ½ in pieces of Pyrex tubing of 7 mm. diameter, and heated at 420° C. During the addition, the apparatus is swept out with nitrogen. The product, collected by means of an efficient condenser at the bottom of the tube, is dissolved in dilute hydrochloric acid and the mixture extracted with three portions of ether. The aqueous acid solution is saturated with potassium carbonate and the product removed by extraction with ether. Distillation of the ether solution gives methyl 3-(2-tropene)-carboxylate as a pale yellow liquid, B. P. 131–134° C. (15 mm.), $n_D^{25.5}$ 1.4998.

*Methyl 3-tropanecarboxylate.*—Methyl 3-(2-tropene)-carboxylate (13 g. prepared as above) dissolved in 100 ml. of methanol is hydrogenated over 5 g. of Raney nickel catalyst at 50 p. s. i. pressure at room temperature until hydrogen absorption ceases. Distillation of the mixture, after removal of the catalyst by filtration, gives methyl 3-tropanecarboxylate as a colorless liquid, B. P. 128–132° C. (18 mm.); $n_D^{25}$ 1.4819.

*Diphenyl 3-tropanecarbinol.*—A solution of phenyl lithium in 100 ml. of ether is prepared in the usual way from 34.5 g. of bromobenzene and 3.5 g. of lithium. To the stirred solution cooled at 0° C. is slowly added 10.1 g. of methyl 3-tropanecarboxylate dissolved in 100 ml. of ether. The mixture is stirred 90 min. at room temperature and then added to 150 ml. of water. The white solid which formed is collected on a filter and washed with ether. Recrystallization of the solid from ethyl acetate gives diphenyl 3-tropanecarbinol which melts at 185.5–186° C.

*3-benzohydrylidenetropane.*—A solution of 5.6 g. of diphenyl-3-tropanecarbinol in a mixture of 20 ml. of glacial acetic acid and 25 ml. of dilute hydrochloric acid is heated at reflux for 10 min. and then evaporated to dryness in vacuo. Crystallization of the residue from a mixture of ethanol and ether gives 3-benzohydrylidenetropane hydrochloride as white crystals melting at 275-278° C.

To obtain the free base the hydrochloride salt is added to 40% sodium hydroxide solution and the mixture extracted with ether. Evaporation of the ether solution gives 3-benzohydrylidenetropane as a colorless oil. The picrate of the base, after recrystallization from aqueous ethanol, melts at 237–238° C.

*3-benzohydrylidenetropane methobromide.*—By allowing a mixture of 1.5 g. of 3-benzohydrylidenetropane and excess methyl bromide in acetone solution to stand for several hours at room temperature, the methobromide salt is obtained. After recrystallization from a mixture of isopropanol and acetone the salt melts at 281–285° C.

*3-benzohydrylidene tropane etho-ethylsulfate.*—By heating a mixture of one gram of 3-benzohydrylidenetropane and excess diethylsulfate in acetone solution at reflux temperature for 5 hours the quaternary ammonium salt is obtained as a white solid.

Example 2.—3-[di-(2-thienyl)methylidene]tropane

*Di-(2-thienyl)-3-tropanecarbinol.*—A solution of 2-thienyl magnesium bromide in 100 ml. of ether is prepared in the usual way from 16.6 g. of 2-bromothiophene and 2.4 g. of magnesium. To the stirred solution, cooled to 0° C., is slowly added a solution of 6.3 g. of methyl 3-tropanecarboxylate (made following the procedure of Example 1) in 20 ml. of ether. After this addition, the mixture is stirred for two hours at room temperature. The mixture is cooled to 0° C. and an aqueous solution of 97 g. of the sodium salt of ethylenediamine tetraacetic acid added slowly with stirring. The ether layer is removed and the aqueous mixture extracted with several portions of ether. Evaporation of the ether gives the crude product as a thick brown oil. The oil is dissolved in dilute hydrochloric acid and the solution extracted with two portions of ether. The acid solution is saturated with potassium carbonate and the mixture extracted with several portions of chloroform. Distillation of the chloroform solution under reduced pressure gives 2-thienyl 3-tropane ketone as a colorless oil, B. P. 142–143° C. (0.4 mm.).

A dark solid residue remained in the distilling flask after removal of the ketone. The solid was dissolved in hot ethyl acetate and the solution was decolorized by boiling with charcoal. After removal of the charcoal by filtration, white crystals of di-(2-thienyl)-3-tropane-carbinol separated from the cooled filtrate. The amino carbinol melted at 157–159° C.

*3-[di-(2-thienyl)methylidene]tropane.*—Dry hydrogen chloride is passed into an ice-cooled solution of 0.5 g. of di(2-thienyl)-3-tropane carbinol in chloroform until the solution is strongly acid. Addition of ether precipitates an oil which gradually crystallizes as a light orange solid. After decolorization of the product with charcoal and recrystallization from ethanol-ether, 3-[di-(2-thienyl)methylidene]tropane hydrochloride is obtained as white crystals melting at 215–216° C. After drying at 100° C. in vacuo, the salt melts at 224–225° C.

Example 3.—1,1-di-(2-thienyl)-2-(3-tropane)ethylene

*Ethyl cyano 3-tropaneacetate.*—A mixture of 13.9 g. of tropinone, 11.3 g. of ethyl cyanoacetate, 1.6 g. of ammonium acetate, 7.3 g. of acetic acid, 20 ml. of absolute ethanol and 0.6 g. of palladium on charcoal catalyst is shaken under hydrogen at 60 p. s. i. and 50° C. Hydrogenation is interrupted when one mole equivalent of hydrogen has been absorbed. After removal of the catalyst, the solution is evaporated in vacuo on a warm water bath. The amber oily residue is dissolved in dilute hydrochloric acid and the solution extracted with ether. The acid solution is neutralized and saturated with potassium carbonate and the product removed by extraction with ether. Distillation of the ether solution gives ehyl cyano 3-tropaneacetate as a yellow oil, B. P. 116–118° C. (0.3 mm.); $n_D^{24}$ 1.4942.

*Ethyl 3-tropaneacetate.*—A solution of 8 g. of ethyl cyano 3-tropaneacetate in 30 ml. of 37% hydrochloric acid is refluxed for 13 hours. The solution is evaporaed in vacuo and the residue dried by successsive addition and removal by distillation of absolute ethanol. The crude 3-tropane-acetic acid hydrochloride is esterified by allowing its solution in 50 ml. of dry ethanol saturated with hydrogen chloride to stand 3 days at room temperature. Most of the alcohol is distilled in vacuo, cold concentrated potassium hydroxide solution is added to the residue and the product removed by extraction with ether. After distillation of the solvent, ethyl 3-tropaneacetae is obained as a colorless oil distilling at 104–105° C. (2 mm.); $n_D^{25}$ 1.4774.

*1,1-di-(2-thienyl)-2-(3-tropane)ethanol.*—A solution of phenyl lithium in 100 ml. of ether is prepared in the usual way from 2. g. of lithium and 22 g. of bromobenzene. With stirring 11.8 g. of thiophene dissolved in 20 ml. of ether is slowly added and the resulting mixture stirred and heated at reflux temperature for 2 hours. To the mixture cooled to —20° C. is slowly added a solution of 10 g. of ethyl 3-tropaneacetate in 20 ml. of ether after which stirring is continued for 2 hours at room temperature. Ice water is added to the mixture which is then stirred vigorously until two clear layers results. From the ether layer (dried over sodium sulfate), after evaporation of solvent, 1,1-di-(2-thienyl)-2-(3-tropane) ethanol is obtained as a solid which melts at 138–140° C. after recrystallization from ethyl acetate.

*1,1-di-(2-thienyl)-2-(3-tropane)ethylene.*—A mixture of one gram of 1,1-di-(2-thienyl)-2-(3-tropane)-ethanol, 2 g. of oxalic acid, and 3 ml. of water is heated at reflux temperature for 2 hours. The cooled mixture is made alkaline with 10% sodium hydroxide solution and the product is removed by extraction with three portions of ether. Evaporation of the ether gives 1,1-di-(2-thienyl)-2-(3-tropane)-ethylene as an orange oil which solidifies when stirred with petroleum ether. The solid after recrystallization from petroleum ether melts at 74–76° C. The picrate of the base, recrystallized from aqueous acetone, melts at 190–192° C.

*1,1-di-(2-thienyl) - 2 - (3-tropane)ethylene hydrochloride.*—Addition of hydrogen chloride to an ether solution of 1,1-di-(2-thienyl)-2-(3-tropane)-ethylene gives the hydrochloride salt melting at 230–232° C. after recrystallization from ethanolether.

*1,1 - di-(2-thienyl)-2-(3-tropane)ethylene methobromide.*—By allowing a mixture of 1,1-di-(2-thienyl)-2-(3-tropane)-ethylene and excess methylbromide in acetone solution to stand at room temperature for several hours, the methyl bromide salt M. P. 252–253° C., is obtained.

Example 4.—1,1-diphenyl-2(3-tropane)ethylene

*1,1-diphenyl-2-(3-tropane)ethanol.*—To a solution of phenyl lithium in 360 ml. of ether, prepared from 94 g. of bromobenzene and 8.3 g. of lithium cooled to 0° C. is slowly added with stirring a solution of 42 g. of ethyl 3-tropaneacetate (made following the procedure of Example 3) in 100 ml. of ether. Following the addition the mixture is stirred at 0° C. for one hour and then at room temperature for 3.5 hours. The ether solution is decanted from the solid lithium complex which formed and added with shaking to ice water. The ether layer is removed and the solvent evaporated to give solid crude 1,1-di-phenyl-2-(3-tropane)ethanol. To the solid lithium complex is added a mixture of equal volumes of ice water and chloroform and the mixture is stirred mechanically until two clear layers result. The chloroform layer is separated and the solvent evaporated to give an additional amount of the amino diphenylcarbinol. The solids from the ether and chloroform extracts are combined, washed with a small volume of ether, and recrystallized from ethyl acetate to give white crystals of pure 1,1-diphenyl-2-(3-tropane)ethanol, M. P. 146.5–147.5° C.

*1,1-diphenyl-2(3 - tropane)ethylene hydrochloride.*—A solution of 14.6 g. of 1,1-diphenyl-2(3-tropane)ethanol hydrochloride in a mixture of 29 ml. of 37% hydrochloric acid and 100 ml. of acetic acid is refluxed for 30 minutes. Evaporation of the mixture to dryness in vacuo gives the crystalline hydrochloride of 1,1-diphenyl-2(3-tropane)-ethylene which is purified by recrystallization from a mixture of alcohol and ether. The pure amine salt melts at 217–218° C.

To obtain the free base the amine hydrochloride is shaken with a mixture of ether and concentrated ammonium hydroxide solution. The ether layer is separated and the solvent evaporated to give 1,1-diphenyl-2(3-tropane)ethylene as a white crystalline solid which melts at 109.5–110° C. after recrystallization from acetone.

*1,1-diphenyl-2(3-tropane)ethylene methobromide.*—A mixture of 1 gram of 1,1-diphenyl-2(3-tropane)ethylene and excess methylbromide in acetone solution is allowed to stand several hours at room temperature. The methobromide salt separates as white crystals which melt at 286° C. after recrystallization from ethanol.

*1,1-diphenyl-2(3-tropane)ethylene maleate.*—By adding 0.12 g. of maleic acid to 0.30 g. of 1,1-diphenyl-2(3-tropane)ethylene dissolved in ethanol and evaporating the resulting solution to dryness in vacuo the maleate salt of the olefin base is obtained.

*1,1-diphenyl-2-(3-tropane)ethylene metho-p-toluenesulfonate.*—An acetone solution of one gram of 1,1-diphenyl-2-(3-tropane)ethylene and excess methyl p-toluenesulfonate is heated at reflux temperature for five minutes. By addition of ether to the cooled solution the quarternary ammonium salt is precipitated as a white solid.

Example 5.—1-phenyl-1-(2-thienyl)-2-(3-tropane) ethylene

*3-tropaneacetic acid hydrochloride.* — 15 grams of ethyl 3-tropaneacetate (made as in Example 3) is dissolved in 37% hydrochloric acid and the solution refluxed for several hours. Evaporation of the solution to dryness in vacuo gives 3-tropaneacetic acid hydrochloride which melts at 172–174° C. after recrystallization from a mixture of methanol and ether.

*Phenyl 3-tropanemethyl ketone.*—A solution of phenyl lithium in 100 ml. of ether is prepared in the usual way under nitrogen from 31.4 g. of bromobenzene and 2.8 g. of lithium. In one portion, 11 g. of 3-tropaneacetic acid hydrochloride is added and the mixture is heated to reflux temperature with stirring. The heat source is removed and the mixture allowed to reflux spontaneously until the reaction subsides. Heating and stirring are then continued for nine hours. The mixture is cooled to 0° C. and decomposed by the slow addition of 50 ml. of water. The ether layer is removed, the aqueous layer extracted with ether, and the extracts are dried over sodium sulfate. Passage of hydrogen chloride into the ether solution precipitates the hydrochloride salt of phenyl 3-tropanemethyl ketone. The crude salt, after washing with ether, is reconverted to the base by treatment with ammonium hydroxide and extraction of the product with ether. Distillation of the ether extract under reduced pressure gives phenyl 3-tropanemethyl ketone, B. P. 138–141° C. (0.2 mm.).

*1-phenyl-1-(2-thienyl)-2-(3-tropane)ethanol.*—A solution of phenyl lithium in 100 ml. of ether is prepared in the usual way from 19 g. of bromobenzene and 1.7 g. of lithium. With stirring 10 g. of thiophene dissolved in ether is slowly added and the resulting mixture is stirred and heated at reflux temperature for 2 hours. To the mixture cooled to −20° C. is slowly added a solution of 10 g. of phenyl 3-tropanemethyl ketone in 90 ml. of ether after which stirring is continued for 2 hours at room temperature. The ether solution is decanted from the solid lithium complex which forms and added with shaking to ice water. The ether layer is removed and the solvent evaporated to give solid crude 1-phenyl-1-(2-thienyl)-2-(3-tropane)ethanol. To the solid lithium complex is added a mixture of equal volumes of ice water and chloroform and the mixture is stirred mechanically until two clear layers result. The chloroform layer is separated and the solvent evaporated to give an additional amount of the amino thienylcarbinol. Recrystallization of the crude product from ethyl acetate solution decolorized by charcoal gives white crystals of 1-phenyl-1-(2-thienyl)-2-(3-tropane)ethanol melting at 137.5–139° C.

*1-phenyl-1-(2-thienyl)-2-(3-tropane)ethylene.*—A mixture of 9.7 g. of 1-phenyl-1-(2-thienyl)-2-(3-tropane)-ethanol, 19.4 g. of oxalic acid and 29 ml. of water is heated at reflux temperature for two hours. The cooled mixture is made alkaline with 10% sodium hydroxide solution and the product is removed by extraction with three portions of ether. Evaporation of the ether gives an orange oil which upon standing at room temperature, crystallizes to a solid melting at 65–70° C. Recrystallization of the crude 1-phenyl-1-(2-thienyl)-2-(3-tropane)-ethylene from petroleum ether yields crystals which melt at 69–72° C. The picrate of the base, after several recrystallizations from aqueous acetone, melts at 209–210° C.

*1-phenyl-1-(2-thienyl)-2-(3-tropane)ethylene tartrate.*—Addition of 1 gram of the base formed above to an acetone-ethanol solution containing an equimolecular amount of tartaric acid yields the tartrate salt which melts at 174–175° C. after recrystallization from ethanol-ether mixture.

*1-phenyl-1-(2-thienyl)-2-(3-tropane)ethylene methobromide.*—By allowing a mixture of 1 gram of the base formed above and excess methyl bromide in acetone solution to stand for several hours at room temperature, the methobromide salt is obtained. After recrystallization from a mixture of ethanol and ether the salt melts at 258–259° C.

*Example 6.*—*1-phenyl-1-(2-pyridyl)-2-(3-tropane)-ethylene*

*1-phenyl-1-(2-pyridyl)-2-(3-tropane)ethanol.*—A solution of n-butyl lithium in 25 ml. of ether is prepared in the usual way from 3.7 g. of n-butyl chloride and 0.7 g. of lithium. With stirring the solution is cooled to −45° C. and 5.5 g. of 2-bromopyridine dissolved in 10 ml. of ether is added slowly. After the addition, the mixture is stirred 10 minutes and 2.5 g. of phenyl 3-tropanemethyl ketone, made following the procedure of Example 5, dissolved in 30 ml. of ether is added slowly. The mixture is then stirred 15 minutes at −15° C. Water (50 ml.) is added slowly and the mixture is stirred vigorously for 15 minutes. A yellow solid formed which is collected on a filter and washed with ether. The ether layer in the filtrate is separated and saved. The solid is stirred vigorously in a mixture of equal volumes of chloroform and water until two clear layers result. The chloroform layer is removed and combined with the ether solution above. Evaporation of the solvents in vacuo gives a yellow oil which crystallizes when stirred with ether. By recrystallization of the product from ethyl acetate 1-phenyl-1-(2-pyridyl)-2-(3-tropane)ethanol is obtained as white crystals melting at 117–118.5° C.

*1-phenyl-1-(2-pyridyl)-2-(3-tropane)ethylene.*—A mixture of one gram of 1-phenyl-1-(2-pyridyl)-2-(3-tropane)ethanol and 2 ml. of 85% sulfuric acid is heated at 155° C. for 15 minutes. The cooled mixture is added to ice water, the resulting solution made basic with ammonium hydroxide, and the product is removed by extraction with several portions of chloroform. Evaporation of the chloroform gives 1-phenyl-1-(2-pyridyl)-2-(3-tropane)-ethylene as a solid melting at 91–93° C. By recrystallizing the solid several times from acetone white crystals melting at 97.5–99.5° C. are obtained.

*1-phenyl-1-(2-pyridyl)-2-(3-tropane)ethylene methobromide.*—By allowing a mixture of 1 gram of the base and excess methyl bromide dissolved in acetone to stand for several hours at room temperature, the methobromide salt is obtained. The salt melted at 228–230° C. after recrystallization from ethanol-ether.

*1-phenyl-1-(2-pyridyl)-2-(3-tropane)ethylene tartrate.*—By addition of a solution of 0.08 g. of tartaric acid in ethanol to 0.15 g. of 1-phenyl-1-(2-pyridyl)-2-(3-tropane)ethylene dissolved in acetone the tartrate salt is obtained as a white solid melting at 165–167° C. after recrystallization from ethanol-ether.

*Example 7.*—*Dehydration product of 1-ethyl-1-phenyl-2-(3-tropane)ethanol*

*1-ethyl-1-phenyl-2-(3-tropane)ethanol.*—A solution of ethyl magnesium bromide in 200 ml. of ether is prepared from 7.3 g. of magnesium and 32.7 g. of ethyl bromide in the usual way. While the solution is stirred and cooled at 0° C., 12.2 g. of phenyl 3-tropanemethyl ketone (made following the procedure of Example 5) dissolved in 50 ml. of ether is added slowly. The reaction mixture is stirred 1.5 hours at room temperature and then 1.5 hours at reflux temperature after which time it is decomposed by addition to a mixture of cracked ice and 21 g. of ammonium chloride in 50 ml. of water. The ether layer is removed and the aqueous phase extracted twice with chloroform. Evaporation of solvents from the combined extracts gives an oily residue which yields when stirred with ether, 1-ethyl-1-phenyl-2-(3-tropane)ethanol as a while powder melting at 119–120° C. From the filtrate from the solid is recovered the starting material, phenyl 3-tropanemethyl ketone.

*Dehydration product of 1-ethyl-1-phenyl-2-(3-tropane)ethanol.*—A solution of 0.44 g. of 1-ethyl-1-phenyl-2-(3-tropane)ethanol in 4 ml. of concentrated hydrochloric acid is heated at 100° C. for 40 minutes. Evaporation of the solution to dryness in vacuo gives the extremely hygroscopic hydrochloride salt of the dehydration product of the amino carbinol. The ultraviolet absorption spectrum of the salt is typical of that of phenyl-substituted ethylene derivatives. By recrystallization of the solid from ethanol-butanone white crystals melting over the range of 170° C. to 200° C. are obtained. A second recrystallization of the salt from a mixture of ethyl acetate, ethanol and ether gives crystals melting at 214–215° C. Ultraviolet spectral analysis of this material indicates that it is a phenyl-substituted ethylenic derivative (log $\epsilon$=3.78; $\lambda_{max}$=238 mu.)

*Example 8.—Dehydration product of 1-(2-cyclohexylethyl)-1-phenyl-2-(3-tropane)ethanol*

2-cyclohexylethyl 3-tropanemethyl ketone.—An ether solution of 2-cyclohexylethyl magnesium bromide is prepared in the usual way from 7 g. of magnesium and 51.8 g. of cyclohexylethyl bromide. To the stirred solution cooled to 0° C. is added slowly 15 g. of ethyl 3-tropaneacetate (made following the procedure of Example 3) dissolved in 30 ml. of ether. The mixture is stirred at 0° C. for 0.5 hr. and then at room temperature for 2.5 hours. The mixture is again cooled to 0° C. and a solution of 290 g. of the sodium salt of ethylenediaminetetraacetic acid in 345 ml. of water is added slowly with stirring. The ether layer is removed and the aqueous mixture extracted with several portions of ether. Distillation of the ether solution under reduced pressure gives 2-cyclohexylethyl 3-tropanemethyl ketone; B. P. 157–164° C. (0.7 mm.); $n_D^{24.5}$ 1.5010.

1 - (2-cyclohexylethyl) - 1 - phenyl - 2 - (3 - tropane)-ethanol.—A solution of phenyl lithium in 75 ml. of ether is prepared in the usual way from 0.8 g. of lithium and 9.4 g. of bromobenzene. With stirring 7.7 g. of cyclohexylethyl-3-tropane-methyl ketone dissolved in 20 ml. of ether is slowly added to the solution cooled to 0° C. The mixture is stirred one hour at 0° C. and 3 hours at room temperature. Ice water is then slowly added and the resulting mixture stirred vigorously for 30 minutes. The ether layer is separated and the aqueous layer extracted with ether. On evaporation of the ether solution (dried over sodium sulfate) a clear oil is obtained which crystallizes when stirred with a small volume of petroleum ether. Recrystallization of the white solid from ethyl acetate gives transparent crystals of 1-(2-cyclohexylethyl)-1-phenyl-2-(3-tropane)ethanol melting at 104–106° C.

Dehydration product of 1-(2-cyclohexylethyl)-1-phenyl-2-(3-tropane)ethanol.—A solution of one gram of 1-(2-cyclohexylethyl)-1-phenyl-2-(3-tropane)ethanol in a mixture of 10 ml. of glacial acetic acid and 3 ml. of 37% hydrochloric acid is heated at reflux temperature for 30 minutes. Evaporation of the solution to dryness in vacuo gives the hydrochloride of the dehydration product of the amino alcohol as a colorless oil. The ultraviolet absorption spectrum of the salt is typical for that of a phenyl-substituted ethylenic derivative (log $\epsilon$=3.58; $\lambda_{max}$=235 mu.).

*Example 9.—Dehydration product of 1-cyclohexyl-1-phenyl-2-(3-tropane)ethanol*

Cyclohexyl 3-tropanemethyl ketone.—A solution of cyclohexyl magnesium bromide in 700 ml. of ether is prepared in the usual way from 11.5 g. of magnesium and 77 g. of cyclohexyl bromide. To the stirred solution cooled to 0° C. is added slowly 25 g. of ethyl 3-tropaneacetate (made following the procedure of Example 3) dissolved in 45 ml. of ether. The mixture is stirred at 0° C. for 0.5 hr. and then heated at the reflux temperature for 5 hours. The mixture is again cooled to 0° C. and a solution of 483 g. of the sodium salt of ethylenediaminetetraacetic acid in 590 ml. of water is added slowly with stirring. The ether layer is removed and the aqueous mixture is extracted with several portions of ether. Distillation of the ether solution under reduced pressure gives cyclohexyl 3-tropanemethyl ketone boiling at 142–153° C. (0.8 to 1.1 mm.). The distilled product crystallizes to a white solid on standing.

Cyclohexyl - 1 - phenyl - 2 - (3 - tropane)ethanol.—A solution of phenyl lithium in 130 ml. of ether is prepared in the usual way from 1.6 g. of lithium and 18 g. of bromobenzene. With stirring 10 g. of cyclohexyl 3-tropanemethyl ketone dissolved in 40 ml. of ether is slowly added to the solution cooled to 0° C. The mixture is stirred 20 minutes at 0° C. and then heated at the reflux temperature for 5 hours. Ice water (100 ml.) is slowly added with stirring and the white solid which separates is collected on a filter. The solid is stirred with equal volumes of chloroform and water for 30 minutes and the chloroform layer is separated. The ether layer of the filtrate from the solid is combined with the chloroform solution and the solvents are removed in vacuo to give solid crude 1-cyclohexyl-1-phenyl-2-(3-tropane)ethanol. After two recrystallizations of the solid from ethyl acetate, the pure product, melting at 139–140.5° C., is obtained.

Dehydration product of 1-cyclohexyl-1-phenyl-2-(3-tropane) ethanol.—A solution of one gram of 1-cyclohexyl-1-phenyl-2-(3-tropane)ethanol in a mixture of 10 ml. of glacial acetic acid and 3 ml. of 37% hydrochloric acid is heated at reflux temperature for 30 minutes. Evaporation of the solution to dryness in vacuo gives the dehydration product of the amino alcohol as a colorless oil which crystallizes when stirred with ether. The salt, when collected on a filter, rapidly absorbs water to form a crystalline hydrate. Recrystallization of the hydrochloride from ethanol-ether gives white crystals melting at 195–196° C. after drying at 100° C. in vacuo.

The free base is obtained as a colorless oil by adding the hydrochloride salt to ammonium hydroxide solution and removing the amine by extraction with ether.

The hydroiodide salt is obtained by adding hydroiodic acid to an acetone solution of the unsaturated base and diluting the solution with ether to precipitate the salt. After recrystallization from butanone-ether, the hydroiodide salt melts at 222.5–224° C.

The methobromide salt is prepared by allowing a mixture of the base and excess methyl bromide in acetone solution to stand at room temperature for several hours. The white solid melts at 250–253° C. after recrystallization from water.

Butyl iodide salt of the dehydration product of 1-cyclohexyl-1-phenyl-2-(3-tropane)ethanol.—The butyl iodide quaternary ammonium salt of the unsaturated base of the dehydration product obtained above is obtained as a white solid by heating a mixture of one gram of the amine and excess butyl iodide in acetone solution at reflux temperature for 5 hours.

*Example 10.—1-p-anisyl-1-phenyl-2-[3-(N-isopropylnortropane)]-ethylene*

Methyl 3-(N-isopropylnortropane)acetate.—A mixture of 16.7 g. of N-isopropylnortropanone, 11.3 g. of ethyl cyanoacetate, 1.6 g. of ammonium acetate, 7.3 g. of acetic acid, 20 ml. of absolute ethanol and 0.6 g. of palladium on charcoal catalyst is shaken under hydrogen at 60 p. s. i. and 60° C. Hydrogenation is interrupted when one mole equivalent of hydrogen has been absorbed. After removal of the catalyst, the solution is evaporated in vacuo on a warm water bath. The oily residue is dissolved in concentrated hydrochloric acid and the solution is extracted with several portions of ether. The aqueous acid solution is refluxed 12 hours, evaporated in vacuo, and the residue is dried by successive addition and removal by distillation of dry benzene. The crude 3-(N-isopropylnortropane)acetic acid hydrochloride so obtained is esterified by allowing its solution in 100 ml. of anhydrous methanol saturated with hydrogen chloride to stand 3 days at room temperature. Most of the methanol is distilled under reduced pressure, cold concentrated potassium hydroxide solution is added to the residue, and the product is removed by extraction with ether. Distillation of the ether solution in vacuo gives methyl 3-(N-isopropylnortropane)acetate as a colorless oil distilling at 124–127° C. (0.3 mm.).

*p-Anisyl 3-(N-isopropylnortropane)methyl ketone.—* A solution of p-anisyl magnesium bromide in 200 ml. of ether is prepared from 28 g. of p-bromoanisole and 3.7 g. of magnesium in the usual way. The solution is cooled to 0° C. and 11.3 g. of methyl 3-(N-isopropylnortropane)acetate dissolved in 25 ml. of ether is added slowly with stirring. After the addition the mixture is stirred for one hour at room temperature and is then heated at reflux temperature for 2 hours. The mixture is cooled to 0° C. and a solution of 135 g. of the sodium salt of ethylene-diamine tetraacetic acid in 180 ml. of water is added slowly with stirring. The ether layer is removed and the aqueous layer is extracted with two portions of chloroform. Evaporation of the solvents from the combined extracts gives the crude product as a thick oil which is purified by distillation under reduced pressure. p-Anisyl 3-(N-isopropylnortropane)-methyl ketone obtained in this way boils at 160–164° C. (0.2 mm.) and crystallizes as a white solid upon standing.

*1 - p-anisyl - 1-phenyl-2-[3-(N-isopropylnortropane)]-ethanol.—* To a solution of phenyl lithium in 45 ml. ether, prepared in the usual way from 7.9 g. of bromobenzene and 0.7 g. of lithium, is slowly added with stirring at 0° C. a solution of 7.5 g. of p-anisyl 3-(N-isopropylnortropane)methyl ketone in 20 ml. of ether. Following the addition the mixture is stirred at 0° C. for one hour, and then at room temperature for four hours. Water (50 ml.) is then added and the mixture is stirred vigorously for 2 hours. The ether layer is removed and the aqueous mixture is extracted with two portions of chloroform. Evaporation of the solvents from the combined extracts gives a crystalline residue of crude product which is purified by recrystallization from ethyl acetate. In this way, 1 - (p-anisyl)-1-phenyl-2-[3-(N-isopropylnortropane)]-ethanol is obtained as a white crystalline solid.

*1 - p-anisyl - 1-phenyl-2-[3-(N-isopropylnortropane)]-ethylene.—* A mixture of 2 g. of 1-p-anisyl-1-phenol-2-[3-(N-isopropylnortropane)]ethanol, 4 g. of oxalic acid and 6 ml. of water is heated at reflux temperature for 4 hours. The cooled mixture is made alkaline with 10% sodium hydroxide solution and the product is removed by extraction with ether. By evaporation of the ether solution 1-p-anisyl-1-phenyl-2-[3-(N-isopropylnortropane)]-ethylene is obtained.

Example 11.—1,1-diphenyl-3-(3-tropane)-1-propene

*Ethyl β-(3-tropane)propionate.—* To a suspension of 3.7 g. of 3-tropaneacetic acid hydrochloride (made as in Example 5) in 30 ml. of chloroform is added 4.7 g. of thionyl chloride and the resulting mixture is heated at reflux temperatures for 2.5 hours. The solvent and excess thionyl chloride are evaporated in vacuo and the last traces of the latter removed from the solid residue by successive addition and removal by distillation in vacuo of two 50 ml. portions of benzene. In this way, the acid chloride hydrochloride is obtained as a brown powder.

The acid chloride hydrochloride is suspended in 30 ml. of methylene chloride and the mixture added in portions to a solution of diazomethane, prepared in the usual way from 14.7 g. of N-methyl-N-nitroso-N'-nitroguanidine, in 200 ml. of methylene chloride kept at 0° C. After storage of the mixture at room temperature for two hours, the solvent is evaporated in vacuo to give diazomethyl 3-tropanemethyl ketone as a hygroscopic brown powder.

The diazo ketone is dissolved in 35 ml. of absolute ethanol and the solution maintained at 50–60° C. while a suspension of silver oxide, freshly prepared from 10 ml. of 10% silver nitrate solution, in 30 ml. of dry ethanol is added over a 45 min. period. After the addition, the mixture is refluxed for 30 min. and then filtered. By filtration of the filtrate in vacuo, ethyl β-(3-tropane)-propionate is obtained.

*1,1-diphenyl-3-(3-tropane)propanol.—* A solution of phenyl lithium in 500 ml. of ether is prepared in the usual way from 75 g. of bromobenzene and 6.7 g. of lithium. To the stirred solution is slowly added 18 g. of ethyl β-(3-tropane)propionate (made following the above procedure) dissolved in 50 ml. of ether. The mixture is stirred and heated at reflux temperature for 3.5 hours. After cooling 50 ml. of water is added and the mixture stirred vigorously for one hour. The ether layer is removed and the aqueous layer which contains a white solid is shaken vigorously with chloroform. The chloroform layer is separated, combined with the ether solution and the solvents are evaporated in vacuo. In this way, 1,1-diphenyl-3-(3-tropane)propanol is obtained as a white crystalline solid melting at 141–142.5° C.

*1,1-diphenyl-3-(3-tropane)-1-propene.—* A solution of 15 g. of 1,1-diphenyl-3-(3-tropane)propanol in 50 ml. of 37% hydrochloric acid is heated at 100° C. for 1.5 hours and then evaporated to dryness in vacuo. The residue is dissolved in water, the solution is made strongly basic by addition of 40% aqueous sodium hydroxide solution, and the product separated by extraction with ether. Distillation of the ether solution gives 1,1-diphenyl-3-(3-tropane)-1-propene distilling at 170–173° C. (0.4 mm.). The base melts at 59–60° C.

*1,1-diphenyl-3-(3-tropane)-1-propene citrate.—* To a solution of 2.5 g. of 1,1-diphenyl-3-(3-tropane)-1-propene in 20 ml. of acetone is added 1.9 g. of citric acid dissolved in 20 ml. of acetone. The white solid which precipitates is collected by filtration and washed with acetone. The citrate salt obtained in this way melts at 174° C.

Example 12.—1 - (2 - pyridyl) - 1 - p - tolyl - 4 - (3 - tropane)-1-butene

*3-(3-tropane)propanol.—* To a stirred solution of 3 g. of lithium aluminum hydride in 200 ml. of ether is added a solution of 17.8 g. of ethyl β-(3-tropane)propionate (made as in Example 11) in 50 ml. of ether at such a rate that steady reflux of ether is maintained. After the mixture is stirred at reflux temperature for three hours, it is cooled to 0° C. and 7.2 ml. of water is added gradually. The resulting mixture is stirred for two hours, filtered and the collected solid is washed with ether. Distillation of the ether solution in vacuo gives 3-(3-tropane)propanol boiling at 128–131° C. (2 mm.).

*1-chloro-3-(3-tropane)propane.—* To a solution of 7.7 g. of 3-(3-tropane)propanol in 30 ml. of chloroform is slowly added 10 g. of thionyl chloride. The reaction mixture is heated at gentle reflux for 45 minutes and then evaporated to dryness in vacuo. The residue of crude 1-chloro-3-(3-tropane)propane hydrochloride is treated with potassium carbonate solution and the oily base which forms is extracted with ether. Distillation of the ether solution gives 1-chloro-3-(3-tropane)propane boiling at 100–102° C. (1 mm.).

*γ - (3 - tropane)butyronitrile.—* 1 - chloro - 3 - (3 - tropane)propane (5 g.) and 0.1 g. of sodium iodide is added to a solution of 5 g. of potassium cyanide in a mixture of 18 ml. of alcohol and 8 ml. of water. The resulting solution is heated at reflux temperature for 18 hours and then evaporated in vacuo. Sodium hydroxide solution is added to the residual mixture of oil and solid and the oil is separated by extraction with ether. Distillation of the ether solution under reduced pressure gives γ-(3-tropane)butyronitrile boiling at 132–135° C. (0.3 mm.).

*Ethyl γ-(3-tropane)butyrate.—* A solution of 3 g. of γ-(3-tropane)-butyronitrile in 15 ml. of 37% hydrochloric acid is heated at reflux temperature for several hours and then evaporated to dryness in vacuo. The solid residue is dissolved in 35 ml. of absolute ethanol, 0.5 ml. of concentrated sulfuric acid is added, and the resulting solution is heated at reflux temperature for 7 hours. The mixture is concentrated in vacuo and the residue is treated with 40% sodium hydroxide solution. The oil which separates is removed by extraction with ether and purified by distillation under reduced pressure.

In this way, ethyl γ-(3-tropane)-butyrate distilling at 115–119° C. (0.5 mm.) is obtained.

*p-Tolyl γ-(3-tropane)-propyl ketone.*—A solution of p-tolyl magnesium bromide in 40 ml. of ether is prepared in the usual way from 5.1 g. of p-bromotoluene and 0.75 g. of magnesium. To the stirred solution, cooled to 0° C., is slowly added a solution of 2.3 g. of ethyl γ-(3-tropane)-butyrate in 10 ml. of ether. After the addition the mixture is stirred at room temperature for one hour and then at reflux temperature for 2 hours. The mixture is cooled to 0° C. and a solution of 27 g. of the sodium salt of ethylenediaminetetraacetic acid in 36 ml. of water is added slowly with stirring. The ether layer is removed and the aqueous layer is extracted with several portions of ether. Distillation of the ether extracts under reduced pressure gives p-tolyl γ-(3-tropane)propyl ketone boiling at 188–192° C. (0.2 mm.).

*1 - (2 - pyridyl) - 1 - p - tolyl - 4 - (3 - tropane)-butanol.*—A solution of n-butyl lithium in 15 ml. of ether is prepared in the usual way from 1.9 g. of n-butyl chloride and 0.35 g. of lithium. With stirring the solution is cooled to —45° C. and 2.8 g. of 2-bromopyridine dissolved in 5 ml. of ether is added slowly. After the addition the mixture is stirred 10 minutes and 1.5 g. of p-tolyl γ-(3-tropane)-propyl ketone dissolved in 15 ml. of ether is added slowly. The mixture is then stirred 15 minutes at —15° C. Water (25 ml.) is added slowly and the mixture is stirred vigorously for 30 minutes. The ether layer is removed and the aqueous layer is stirred vigorously with an equal volume of chloroform until two clear layers result. Evaporation in vacuo of the solvents from the combined ether and chloroform solutions gives a yellow oil which crystallizes when stirred with a mixture of ether and petroleum ether. By recrystallization of the product from a mixture of ethyl acetate and petroleum ether 1-(2-pyridyl)-1-p-tolyl-4-(3-tropane)butanol is obtained as a white crystalline solid.

*1 - (2 - pyridyl) - 1 - p - tolyl - 4 - (3 - tropane) - 1-butene.*—A mixture of 0.5 g. of 1-(2-pyridyl)-1-p-tolyl-4-(3-tropane)-1-butanol and 2 ml. of 85% sulfuric acid is heated at 155° C. for 15 minutes. The solution is poured onto ice and the mixture made alkaline with ammonium hydroxide. By extraction of the mixture with ether and evaporation of the solvent 1-(2-pyridyl)-1-p-tolyl-4-(3-tropane)-1-butene is obtained.

*Example 13.—Dehydration product of dimethyl 3-tropanecarbinol*

A solution of methyl lithium in 150 ml. of ether is prepared in the usual way from 28.4 g. of methyl iodide and 2.8 g. of lithium. To the solution cooled to 0° C. is added slowly with stirring a solution of 9.2 g. of methyl 3-tropanecarboxylate, made following the procedure of Example 1, in 30 ml. of ether. After the addition the mixture is stirred at 0° C. for one hour and then heated at reflux temperature for 3 hours. The mixture is cooled to 0° C. and decomposed by slow addition of 50 ml. of water. The ether layer is removed and the aqueous phase is stirred vigorously with an equal volume of chloroform until two clear layers result. By evaporation of the combined extracts in vacuo dimethyl 3-tropanecarbinol is obtained as a yellow oil which crystallizes as a white solid when stirred with a small volume of ether.

Dimethyl 3-tropanecarbinol (5 g.) is dissolved in 50 ml. of glacial acetic acid and 15 ml. of 37% hydrochloric acid and the solution is heated at reflux temperature for 45 minutes. Evaporation of the solution to dryness in vacuo gives the dehydration product of the carbinol in the form of its hydrochloride salt.

The salt is added to excess 40% sodium hydroxide solution and the mixture is extracted with several portions of ether. Evaporation of the ether gives the free olefinic base as a pale yellow oil.

*Example 14.—Dehydration product of 1,1-di-n-hexyl-2-[3-(N-isopropylnortropane]ethanol*

*1,1-di-n-hexyl-2-[3-(N-isopropylnortropane)]ethanol.*—A solution of of n-hexyl lithium in 150 ml. of ether is prepared in the usual way from 33 g. of n-hexyl bromide and 3 g. of lithium. To the solution cooled to 0° C. is added slowly with stirring a solution of 11.3 g. of methyl 3-(N-isopropylnortropane)-acetate (made as in Example 10) in 40 ml. of ether. After the addition the mixture is stirred at 0° C. for one hour and then heated at reflux temperature for 3 hours. The mixture is cooled to 0° C. and decomposed by slow addition of 50 ml. of water. The ether layer is removed and the aqueous phase is stirred vigorously with an equal volume of chloroform until two clear layers result. By evaporation of the combined extracts in vacuo and stirring the residual oily residue with petroleum ether, 1,1-di-n-hexyl-2-[3-(N-isopropylnortropane)]-ethanol is obtained as a white crystalline solid.

*Dehydration product of 1,1-di-n-hexyl-2-[3-(N-isopropylnortropane)]-ethanol.*—A solution of 8 g. of 1,1-di-n-hexyl-2-[3-(N-isopropylnortropane)]-ethanol in a mixture of 80 ml. of glacial acetic acid and 25 ml. of 37% hydrochloric acid is heated at reflux temperature for 45 minutes. Evaporation of the solution to dryness in vacuo gives the dehydration product of the carbinol in the form of its hydrochloride salt.

The salt is added to excess 10% sodium hydroxide solution and the mixture is extracted with two portions of ether. Evaporation of the ether gives the free olefinic base as a pale yellow oil.

*Example 15.—Dehydration product of 1-cyclopentyl-1-phenyl-4-(3-tropane)butanol*

*Cyclopentyl 3 - (3 - tropane) - propyl ketone.*—A solution of cyclopentyl magnesium bromide in 350 ml. of ether is prepared in the usual way from 5.8 g. of magnesium and 37 g. of cyclopentyl bromide. To the stirred solution cooled to 0° C. is added slowly 14.3 g. of ethyl γ-(3-tropane butyrate (prepared as in Example 12) dissolved in 30 ml. of ether. The mixture is stirred at 0° C. for one hour and then heated at reflux temperature for 3 hours. The mixture is then cooled to 0° C. and a solution of 242 g. of the sodium salt of ethylenediamine tetra-acetic acid in 300 ml. of water is added slowly with stirring. The ether layer is removed and the aqueous phase is extracted with several portions of ether. Distillation of the ether extract under reduced pressure gives cyclopentyl 3-(3-tropane)-propyl ketone boiling at 152–156° C. (0.8 mm.).

*1-cyclopentyl-1-phenyl-4-(3-tropane)butanol.*—A solution of phenyl lithium in 50 ml. of ether is prepared in the usual way from 11.8 g. of bromobenzene and 1.1 g. of lithium. To the solution cooled to 0° C. is added slowly with stirring a solution of 6.6 g. of cyclopentyl 3-(3-tropane)propyl ketone in 25 ml. of ether. After the addition the mixture is stirred at 0° C. for one hour and then heated at reflux temperature for 3 hours. The mixture is cooled to 0° C. and decomposed by slow addition of 20 ml. of water. The ether layer is removed and the aqueous phase is stirred vigorously with an equal volume of chloroform until two clear layers result. By evaporation of the combined ether and chloroform solutions in vacuo and stirring the residual oily residue with petroleum ether, 1-cyclopentyl-1-phenyl-4-(3-tropane)butanol is obtained as a white crystalline solid.

*Dehydration product of 1-cyclopentyl-1-phenyl-4-(3-tropane)butanol.*—A solution of 3.5 g. of 1-cyclopentyl-1-phenyl-4-(3-tropane)butanol in a mixture of 35 ml. of glacial acetic acid and 10 ml. of 37% hydrochloric acid is heated at reflux temperature for 45 minutes. Evaporation of the solution to dryness in vacuo gives the dehydration product of the carbinol in the form of its hydrochloride salt.

The salt is added to excess concentrated ammonium hydroxide solution and the mixture is extracted with two portions of ether. Evaporation of the ether gives the free olefinic base as a pale yellow oil.

The compounds of Formulas 2, 3, 4 and 5 are the subject matter of my copending applications Serial No. 519,649, filed July 1, 1955; Serial No. 519,647, filed July 1, 1955; Serial No. 519,648, filed July 1, 1955; and Serial No. 519,646, filed July 1, 1955, respectively, and reference may be made thereto for further examples of these compounds as well as for methods of their preparation.

It is not desired to be limited except as set forth in the following claims.

What is claimed is:

1. Compounds of the class consisting of a dehydration product of a tertiary alcohol and the acid addition and quaternary ammonium salts thereof, the tertiary alcohol having the following formula:

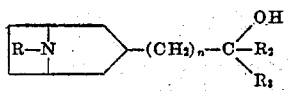

in which R is a lower alkyl radical, $n$ is from 0 to 2, and $R_2$ and $R_3$ are selected from the group consisting of lower alkyl, cycloalkyl having from 5 to 6 carbon atoms, cycloalkyl-alkyl having from 6 to 10 carbon atoms, 2-thienyl, 2-pyridyl, phenyl, phenyl substituted with an alkyl group having from 1 to 4 carbon atoms, phenyl substituted with an alkoxy group having from 1 to 4 carbon atoms.

2. 3-benzohydrylidenetropane methobromide.
3. 1,1-di-(2-thienyl)-2-(3-tropane)ethylene.
4. 1,1-diphenyl-2-(3-tropane)ethylene.
5. 1-phenyl-1-(2-thienyl)-2-(3-tropane)ethylene.
6. Dehydration product of 1-cyclohexyl-1-phenyl-2-(3-tropane)ethanol.

No references cited.